United States Patent
Sterzik et al.

(10) Patent No.: US 6,553,500 B1
(45) Date of Patent: Apr. 22, 2003

(54) PULSED POWER SUPPLY UNIT FOR COMPUTER SYSTEMS

(75) Inventors: Willi Sterzik, Augsburg (DE); Andreas Schweiger, Augsburg (DE)

(73) Assignee: Fujitsu Siemens Computer GmbH, Munich (DE)

( * ) Notice: Subject to any disclaimer, the term of this patent is extended or adjusted under 35 U.S.C. 154(b) by 0 days.

(21) Appl. No.: 09/538,795

(22) Filed: Mar. 30, 2000

Related U.S. Application Data

(63) Continuation of application No. PCT/DE98/02879, filed on Sep. 29, 1998.

(30) Foreign Application Priority Data

Sep. 30, 1997 (DE) .......................................... 197 43 282

(51) Int. Cl.$^7$ ................................................ G06F 1/26
(52) U.S. Cl. ...................................................... 713/300
(58) Field of Search ................................ 713/300, 320, 713/324, 340, 1, 2, 100; 710/8, 10, 15, 16, 17, 18, 19

(56) References Cited

U.S. PATENT DOCUMENTS

| | | | |
|---|---|---|---|
| 5,483,656 A | 1/1996 | Oprescu et al. ............. | 713/320 |
| 5,640,176 A | 6/1997 | Mundt et al. ................ | 345/146 |
| 5,640,574 A | 6/1997 | Kawashima ................. | 713/340 |
| 5,694,607 A * | 12/1997 | Dunstan et al. ............. | 713/340 |
| 5,894,579 A * | 4/1999 | Fujihara ...................... | 713/324 |
| 5,935,252 A * | 8/1999 | Berglund et al. ........... | 713/300 |

FOREIGN PATENT DOCUMENTS

| | | |
|---|---|---|
| EP | 0 616 281 A2 | 9/1994 |
| GB | 2 238 675 A | 6/1991 |

OTHER PUBLICATIONS

"Brainy, Brawny Batteries" (Bassak), dated Jun. 20, 1995, No. 6, Peterborough, NH, US, 4465 Byte.

* cited by examiner

*Primary Examiner*—Peter Wong
*Assistant Examiner*—X. Chung-Trans
(74) *Attorney, Agent, or Firm*—Laurence A. Greenberg; Werner H. Stemer; Ralph E. Locher

(57) ABSTRACT

A power supply unit for a computer system is proposed which has at least one data memory unit, which provides data specific to the power supply unit, for system controllers in the computer system. This achieves the object of offering the capability of ensuring that the power supply unit is not overloaded or underloaded, or that an appropriate message is output to the outside world, without having to explicitly know all the possible operational situations even in the development phase of the power supply unit.

3 Claims, 1 Drawing Sheet

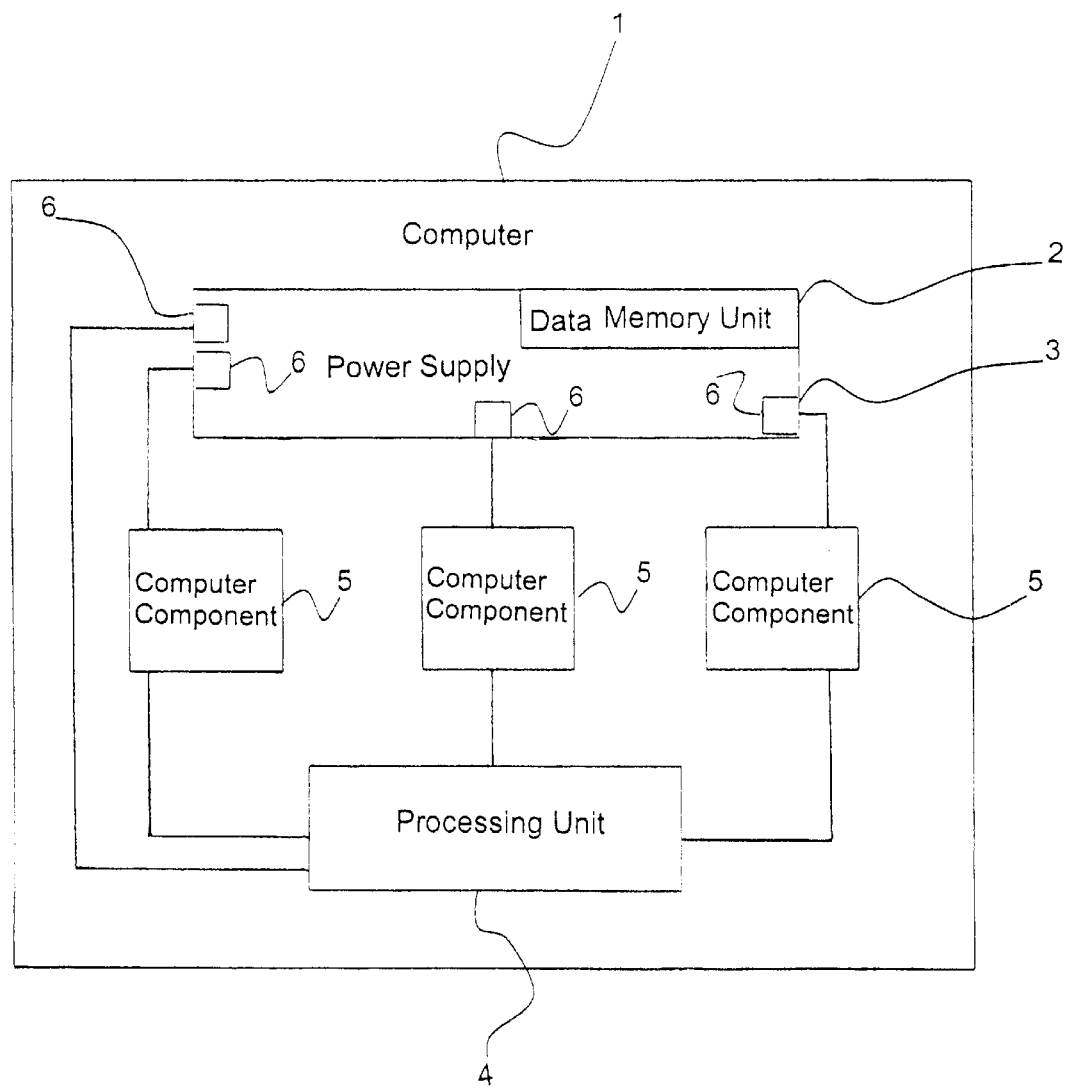

PULSED POWER SUPPLY UNIT FOR COMPUTER SYSTEMS

CROSS-REFERENCE TO RELATED APPLICATION

This is a continuation of copending International Application PCT/DE98/02879, filed Sep. 29, 1998, which designated the United States.

BACKGROUND OF THE INVENTION

FIELD OF THE INVENTION

The invention relates to a power supply unit for computer systems.

Modern computer systems offer the user extensive configuration options. This results in that the upgrade level of a base system may differ significantly from the maximum upgrade level, particularly with respect to the power required from the power supply. On the other hand, the sets of integrated circuits used in modern computer systems increasingly support so-called "Power Management" functions, functions in which components increasingly switch themselves off and in which components are increasingly being switched off, by an operating system of the computer, when they are not required. The operating system is that point within the system that is informed in detail of the exact configuration upgrade level.

Information about what system components are in the energy saving state is also stored in the operating system.

As a result of the increasing capabilities, on the one hand of saving energy and on the other hand of configuring the computer system, the requirements for the power supply unit are becoming ever greater. The power supply unit must be able to supply small currents, while at the same time, a maximum power level must not be exceeded. Particularly in the case of pulsed power supply units for computer systems, it is necessary to remember, owing to the principle on which they operate, that the current must never be below a minimum value, in order to make it possible to comply with the voltage specifications for the power supply unit. Another factor which makes it harder for the power supply unit to comply with the specifications is that the larger manufacturers of computer systems are always trying to use both the power supply unit and the computer system components, for example the mother board, in widely differing systems.

In order to equip the power supply unit for the requirements it has to satisfy, the dynamic range of those products in which it is intended that the power supply unit will be used have had to be recorded and taken into account in the development phase. However, only typical configurations, so to speak, have been measured in this case, and have then been used to deduce the possible maximum values. Components fitted by a customer himself cannot be taken into account. This has resulted in the power supply being either overloaded or underloaded in some cases.

It is known from Published, European Patent Application EP 0 616 281 A, corresponding to U.S. Pat. No. 5,514,946, for battery power supply units to be equipped with storage devices to make it possible for an associated computer system to carry out battery charge management.

However, pulsed power supplies are not subject to the problem of battery charging, but to the problems that were described in the introduction.

SUMMARY OF THE INVENTION

It is accordingly an object of the invention to provide a pulsed power supply unit for computer systems which overcomes the above-mentioned disadvantages of the prior art devices of this general type, by which it is possible either at the same time to ensure that the pulsed power supply unit is not overloaded or underloaded or else, if this is not sufficient, to notify the outside world of an overloading or underloading condition of the pulsed power supply unit, without explicitly having to know all the possible operational situations even in the development phase of the pulsed power supply unit, so that a remedy is feasible in this context, and such a situation exists for only as short a time as possible. In particular, one object of the invention is to specify technical measures by which automatic system configuration at the power supply level is possible in pulsed power supply units.

With the foregoing and other objects in view there is provided, in accordance with the invention, a pulsed power supply configuration for a computer system, including a pulsed power supply unit having at least one data memory unit for a system control of the computer system. The at least one data memory contains power supply data specific to the pulsed power supply unit and configuration data for automatic system reconfiguration of available power to the computer system in dependence on power supply requirements.

In accordance with an added feature of the invention, the at least one data memory unit is a plurality of nonvolatile semiconductor memories.

In accordance with a concomitant feature of the invention, the pulsed power supply unit has components containing measured current values defining a load on the pulsed power supply unit. The pulsed power supply unit transfers the current values and information about available additional functions which is legible to one of the computer system and a user of the computer system.

Other features which are considered as characteristic for the invention are set forth in the appended claims.

Although the invention is illustrated and described herein as embodied in a pulsed power supply unit for computer systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block diagram of a computer system having a pulsed power supply with a data memory unit according to the invention.

DESCRIPTION OF THE PREFERRED EMBODIMENTS

Referring now to the single FIGURE of the drawings in detail, there is shown a computer system 1 containing a pulsed power supply unit 2 having a data memory unit 3 with data specific to the power supply unit 2. The data that are specific to the power supply unit 2 may include, inter alia, information relating to a power capacity of the power supply unit 2. The data are provided at least to a data processing unit 4 running under an associated operating system, which is a data processing system and can operate with the information stored as data.

If the computer system 1 is configured in such a way that the associated operating system records actual current drawn by the computer system 1 and compares the values with the information from the data memory unit 3 in the power supply unit 2, it is possible, if the operating system is also configured in a corresponding manner, for the operating system to react in a suitable way. In a corresponding manner, if all the installed components 5 of the computer system 1 have to identify themselves to the operating system, the operating system is configured to determine at least approximately the maximum and minimum current requirement, and to compare this with the information stored in the power supply unit 2. It reacts in a suitable way if, for example, it is found that the current is less than the minimum current, and prevents the final stages of possible system energy saving states from being selected. The power supply unit 2 can then continue to operate in its specified voltage range. It also reacts in a suitable way when it finds that the maximum current is being exceeded, and a message is output to the customer to fit a more powerful power supply unit, or else to remove components from the computer system 1.

A further advantage of the use of the data memory unit 3 is that other information that is of interest regarding the power supply unit 2 can also be stored and read. For example, the part number of the power supply unit 2 could be stored, which could simplify customer service. This could even be retrieved by remote interrogation. Furthermore, development standards of the power supply unit 2 could be stored, or other information used, for example, for automatic system configuration.

According to these, a nonvolatile semiconductor memory 3 is used as the data memory unit 3 in the power supply unit 2, since this has the advantage that its memory contents are maintained even if the power supply unit 2 fails.

The power supply unit 2 itself has components 6 which supply measured current values in a form which is legible to the data processing unit 4 or the operating system, which leads to more exact decisions by the operating system when it compares the corresponding information with the information stored in the data memory unit 3 of the power supply unit 2.

If, in addition or as an alternative to the form that is legible for the data processing unit 4, the power supply unit 2 also supplies its measured values in a form which is legible. for the user, the user can also be included in the process of checking the situation.

Overall, the use of a data memory unit 3 in the power supply unit 2 also offers the capability for automatic and dynamic system configuration at the power supply level.

The following text describes as example, in general form, of EEPROM contents, in which the case the EEPROM forms the data memory unit 3 in the power supply unit 2.
PRxx;REVuu;DATEaabb;PcccW;MINd.dA;ZUSFf In this case, xx, uu, aabb, ccc, d.d and f are numerical values. In the described example, PR indicates a product number, REV a revision number, DATE a date, P an output power in watts relating to an output voltage, MIN a minimum current in mA relating to the output voltage, and ZUSF an additional function, for example the pulses supplied from a fan per revolution. Multiple details are possible, for example if there are a number of output voltages.

We claim:

1. A pulsed power supply configuration for a computer system, comprising:
a pulsed power supply unit having at least one data memory unit for a system control of the computer system, said at least one data memory containing power supply data specific to said pulsed power supply unit and configuration data for automatic system reconfiguration of available power to the computer system in dependence on power supply requirements.

2. The pulsed power supply unit according to claim 1, wherein said at least one data memory unit is a plurality of nonvolatile semiconductor memories.

3. The pulsed power supply unit according to claim 1, wherein said pulsed power supply unit has components containing measured current values defining a load on said pulsed power supply unit, said pulsed power supply unit transferring the current values and information about available additional functions which is legible to one of the computer system and a user of the computer system.

* * * * *